Dec. 7, 1954   T. N. LOCKYER, JR   2,696,586
CONSTANT CURRENT REGULATOR
Filed Sept. 20, 1951

INVENTOR
Thomas Neusdorfer Lockyer Jr

United States Patent Office 2,696,586
Patented Dec. 7, 1954

2,696,586
CONSTANT CURRENT REGULATOR

Thomas Neudorfer Lockyer, Jr., Mercer, Pa.

Application September 20, 1951, Serial No. 247,420

2 Claims. (Cl. 323—7)

The invention relates to improvements in constant current regulators in which there are one or more moving coils and the objects of improvement are, first, lower losses in the device; and second, to reduce the number of bushing connections needed in connecting said constant current regulator to its load or loads.

Figure 1:
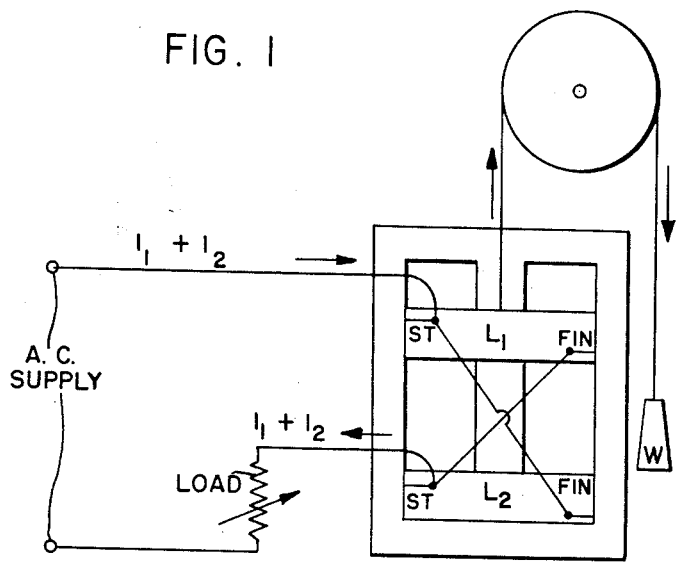
Figure 2:
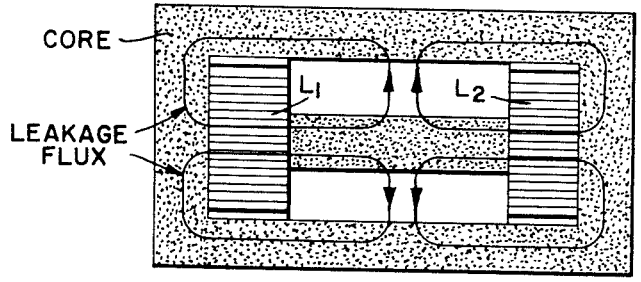
Figure 3:
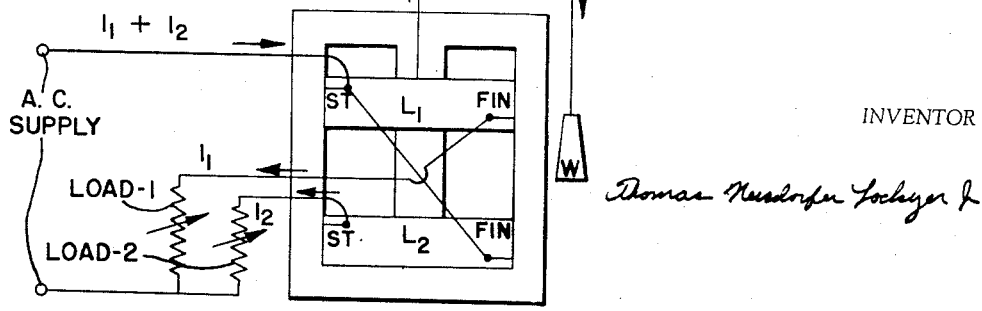

Two forms of regulator connections are shown in the accompanying drawing, in which Figure 1 shows the constant current reactor connection and its load. Figure 2 shows the leakage flux patterns with coils L1 and L2 at maximum separation without regards to any particular moving coil scheme. Figure 3 shows another form of reactor connection.

Referring to Figure 1, the coils L1 and L2 are connected in parallel opposing, the instantaneous alternating current polarities of L1 and L2 are arranged so there exists a negative mutual inductance between them. The line current I1 plus I2 divides, I1 going through coil L1 to the load, and I2 going through coil L2 to the load. As the load is decreased, the quadrature voltage drop across the reactor increases, this tends to increase the current in coils L1 and L2, since the magnetic fields of L1 and L2 oppose on the core, the coils L1 and L2 are forced apart, the coupling between coils L1 and L2 is thereby reduced, the leakage flux increases from coil L1 linking L1 alone and the leakage flux increases from coil L2 linking L2 alone, therefore more inductance is realized in coils L1 and L2 maintaining a constant current in the load. For best results coil L1 should have the same number of turns as coil L2 or approximately so.

Referring to Figure 2, if the same weight of material is used in core and coils this Figure 1 reactor connection is approximately 2% more efficient than the old transformers because, a comparable total leakage flux is divided over both ends of the core. The total leakage flux is not restricted to one end of the core.

Referring to Figure 1, constant current reactor connection is applicable where, providing short circuit load protection is desired, the A. C. supply voltage exceeds the required maximum load voltage drop by enough to compensate for the quadrature drop across reactor at minimum separation. This available load voltage times required constant current times .001 gives maximum kilowatt range of regulation. Maximum separation in this case should be designed to drop, at least, the maximum A. C. supply voltage encountered, at rated constant current I1 plus I2.

Referring to Figure 3, shows another form of constant current reactor. This connection can give double ratings at any given A. C. supply voltage and required load current, and the line current would be double the load current if coil L1 turns equals coil L2 turns.

In Figure 3 the instantaneous alternating current polarities between L1 and L2 are arranged so there exists a negative mutual inductance between them. A portion of the load, load 1 is shown in series with coil L1 and a portion of the load, load 2 is shown in series with coil L2. This division of the load is not necessary but it has certain advantages, among these are the size of insulators needed. In Figure 3 it is possible to load the total kilowatt range of regulation in series with one coil alone. It is easier to consider circuit action by this method. If load 2 were full range kilowatts and load 1 were short circuited, full A. C. supply voltage would appear across coil L1, this would induce a voltage in coil L2 which would add vectorially to the A. C. supply voltage increasing the voltage across load 2, this increases the current through the system coil L2 and load 2. Since the fields of coils L1 and L2 oppose, the coils will move apart, decreasing the coupling, and consequently reducing the induced voltage in coil L2, but the leakage flux can increase now, increasing the reactive drop in coil L2, this results in a phase shift of the terminal voltage of coil L2, with only a slight increase in amplitude, this terminal voltage adds vectorially with the A. C. supply voltage, thus maintaining constant current in load 2. Since the coupling at medium separation is not perfect, that is, about 75% more or less the vectorial voltage in this case will never be adding exactly in phase with the applied voltage, but will form an obtuse triangle with A. C. supply voltage or L1 voltage as the base, volts L2 as the adjacent side and load 2 voltage as the remaining side. As load 2 is decreased to zero the coils move apart and the coil L2 voltage shifts in phase almost 180 degrees from a source of potential to a voltage drop coinciding with the base, A. C. supply voltage or L1 voltage, and increasing in amplitude approximately 25%.

Figure 3 constant current reactor connection is applicable where, providing short circuited load protection is desired, two times the available A. C. supply voltage exceeds the required total load voltage by enough to compensate for the quadrature voltage across the reactor winding or windings at minimum separation. Maximum separation is designed to drop the maximum A. C. supply voltage encountered at normal A. C. supply current I1 plus I2.

Referring to Figure 2, if the same weight of material is used in core and coils, Figure 3 reactor connection is approximately 2% more efficient than the old transformers because a comparable total leakage flux is divided over both ends of the core. The total leakage flux is not restricted to one end of the core.

I am aware that prior to my invention constant current regulators have been made with one or more moving coils, therefore I do not claim any or all moving coil mechanical schemes broadly but, I claim:

1. In the well known constant current regulator which has a closed E section core, and plural, relatively movable windings adapted to generate reactive electromotive force variable at load demand by correlating a mechanical counterbalance and opposing fields and forming a reactor unit in series with its load; the configuration as new of the plural windings connected in parallel opposing so that line current divides from a common connection, traverses each winding setting up opposing fields and joins again to flow through a common load.

2. In the well known constant current regulator which has a closed E section core, and plural, relatively movable windings adapted to generate reactive electromotive force variable at load demand by correlating a mechanical counterbalance and opposing fields and forming a reactor unit in series with its load; the configuration as new of plural windings each in series with its load and these series circuits in parallel so that line current divides from a common connection traverses each winding setting up opposing fields then flows separately through plural loads to a common connection.

References Cited in the file of this patent

UNITED STATES PATENTS

| Number | Name | Date |
|---|---|---|
| 684,165 | Baker | Oct. 8, 1901 |
| 707,150 | Moody | Aug. 19, 1902 |
| 1,480,714 | Fortescue | Jan. 15, 1924 |